(12) United States Patent
Mori (10) Patent No.: US 10,075,824 B2
(45) Date of Patent: Sep. 11, 2018

(54) ELECTRONIC DEVICE, SYSTEM, NOTIFICATION METHOD, AND NOTIFICATION PROGRAM

(71) Applicant: ALPINE ELECTRONICS, INC., Shinagawa-ku, Tokyo (JP)

(72) Inventor: Masaki Mori, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/583,120

(22) Filed: May 1, 2017

(65) Prior Publication Data
US 2017/0366952 A1 Dec. 21, 2017

(30) Foreign Application Priority Data
Jun. 16, 2016 (JP) .................................. 2016-119747

(51) Int. Cl.
*H04W 4/20* (2018.01)
*H04Q 9/00* (2006.01)
*G08C 17/02* (2006.01)

(52) U.S. Cl.
CPC .............. *H04W 4/20* (2013.01); *G08C 17/02* (2013.01); *H04Q 9/00* (2013.01); *G08C 2201/93* (2013.01); *H04Q 2209/43* (2013.01); *H04Q 2209/823* (2013.01); *H04Q 2209/826* (2013.01)

(58) Field of Classification Search
CPC ................. H04Q 9/00; H04Q 2209/43; H04Q 2209/823; H04Q 2209/826; H04W 4/20
USPC ......................................................... 340/870
See application file for complete search history.

(56) References Cited

U.S. PATENT DOCUMENTS

| 9,860,294 | B2 * | 1/2018 | Rehan .................... H04L 65/604 |
| 2011/0039508 | A1 * | 2/2011 | Lindahl ................. G06F 1/3203 455/230 |
| 2016/0132192 | A1 * | 5/2016 | Sutton .................... G06F 3/0482 715/719 |
| 2016/0156717 | A1 * | 6/2016 | Matsumoto ............. H04L 67/14 709/226 |
| 2017/0363431 | A1 * | 12/2017 | Colmagro .......... G01C 21/3438 |

FOREIGN PATENT DOCUMENTS

| JP | 2006-311098 | | 11/2006 |
| JP | 2014109513 | A * | 6/2014 |
| JP | 2015114403 | A * | 6/2015 |
| KR | 20130093970 | A * | 8/2013 |

* cited by examiner

Primary Examiner — Hirdepal Singh
(74) Attorney, Agent, or Firm — Brinks Gilson & Lione (57) ABSTRACT

An in-vehicle device is capable of coupling to a portable terminal, receives content data played by the portable terminal that has been coupled, and outputs the content data that has been received. While music is being played back by the portable terminal, the in-vehicle device estimates a remaining battery level of the portable terminal after playback of the music to be next played back finishes, and provides, when the estimated value is a threshold value or less, notification of the remaining battery level before the playback of music starts and/or after the playback finishes.

18 Claims, 10 Drawing Sheets

| BEFORE PLAYBACK OF SECOND CONTENT STARTS | AFTER PLAYBACK OF SECOND CONTENT FINISHES |
|---|---|
| REMAINING BATTERY LEVEL NEARLY FALLS BELOW 10%. PLEASE START CHARGING. | REMAINING BATTERY LEVEL IS NOW BELOW 10%. PLEASE START CHARGING. |

FIG. 10B

| BEFORE PLAYBACK OF SECOND CONTENT STARTS | AFTER PLAYBACK OF SECOND CONTENT FINISHES |
|---|---|
| REMAINING BATTERY LEVEL NEARLY FALLS BELOW 5%. PLEASE START CHARGING. | REMAINING BATTERY LEVEL IS NEARLY ZERO. PLEASE START CHARGING IMMEDIATELY. |

FIG. 11

ELECTRONIC DEVICE, SYSTEM, NOTIFICATION METHOD, AND NOTIFICATION PROGRAM

RELATED APPLICATION

The present application claims priority to Japanese Patent Application Number 2016-119747, filed Jun. 16, 2016, the entirety of which is hereby incorporated by reference.

BACKGROUND

1. Field of the Invention

The present invention relates to an electronic device capable of outputting content data transmitted from a portable terminal, and more particularly, relates to notification of a remaining battery level of the portable terminal.

2. Description of the Related Art

An in-vehicle device includes a navigation function, an audio/video function, and a TV/radio reception function, and is further capable of cooperating with a multifunctional/highly sophisticated portable terminal, such as a smartphone. Coupling between the in-vehicle device and the smartphone in a vehicle allows a hands-free call through the portable terminal, can acquire various types of information through the Internet using a communication function of the smartphone, or can output from the in-vehicle device music and an image stored in the smartphone.

When an incoming call or a message to the smartphone is received while the in-vehicle device and the smartphone are coupled, interrupt notification of the reception is made to the in-vehicle device. In JP 2006-311098 A, when reception of an e-mail is detected during viewing and listening to content through a portable terminal, a breakpoint of the content is detected so that notification of the e-mail is made.

SUMMARY

Figure 11:
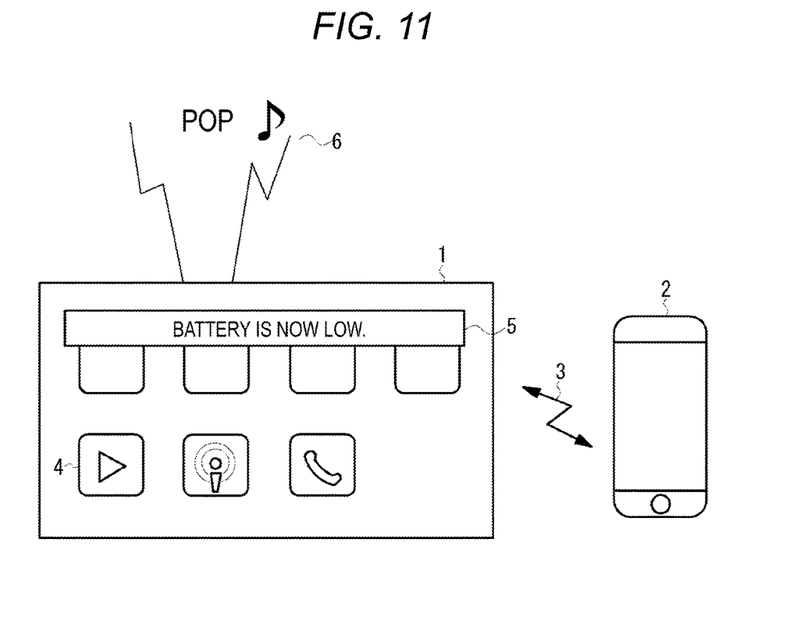
FIG. 11 illustrates a notification method of a remaining battery level in a conventional in-vehicle device.

FIG. 11 illustrates the following state. An in-vehicle device 1 and a smartphone 2 are coupled through radio communication 3. The in-vehicle device 1 executes a cooperative application 4 so as to make the smartphone 2 play back content. The in-vehicle device 1 receives content data that has been played back by the smartphone 2 so that the content data is output from a speaker of the in-vehicle device 1. The smartphone 2 is driven by a battery so that a remaining battery level decreases when playback of the content data continues. Running out the remaining battery level during the playback of the content data interferes with the playback of the content as well as a telephonic operation. Accordingly, the in-vehicle device 1 acquires information on the remaining battery level from the smartphone 2, and outputs, when the remaining battery level is a predetermined level or less, interrupt warnings 5 and 6, such as a beep notifying that the remaining battery level is low, through audio, and a screen display, so as to notify a user of the effect. For example, when the remaining battery level is 10% or 30% even during playback of music, the notification of the warnings 5 and 6 is made. However, when the notification of the warnings 5 and 6 for the remaining battery level is made while listening to the music, the music is interrupted so that the user is not necessarily comfortable.

The present invention has been made in order to solve the conventional problem, and an object of embodiments of the present invention is to provide an electronic device, a system, a notification program, and a notification method capable of providing notification of a remaining battery level of a portable terminal, preventing interference in viewing and listening to content as much as possible.

An electronic device according to an embodiment of the present invention is configured to couple to a portable terminal and includes: a reception unit configured to receive content data played back by the portable terminal; an output unit configured to output the content data that has been received; an estimation unit configured to estimate a remaining battery level of the portable terminal after playback of second content finishes, the second content to be played back following content being played back by the portable terminal; and a notification unit configured to provide notification of the remaining battery level through the output unit at least before the playback of the second content starts or after the playback finishes, based on an estimation result of the estimation unit.

Preferably, the estimation unit includes a battery information acquisition unit that acquires battery information on the remaining battery level of the portable terminal from the portable terminal, the estimation unit configured to estimate the remaining battery level after the playback of the second content finishes, based on the battery information. Preferably, the estimation unit estimates the remaining battery level based on playback duration of the second content. Preferably, the estimation unit includes a content information acquisition unit that acquires content information on playback duration of the content from the portable terminal, the estimation unit configured to estimate the remaining battery level in finishing the playback of the second content based on the content information. Preferably, the notification unit, when an estimated value of the remaining battery level of the estimation unit is a first threshold value or less, provides the notification of the remaining battery level before the playback of the second content starts or after the playback finishes. Preferably, the notification unit, when the estimated value is a second threshold value or less, the second threshold value being smaller than the first threshold value, provides first notification of the remaining battery level before the playback of the second content starts, and, when the estimated value exceeds the second threshold value, provides second notification of the remaining battery level after the playback of the second content finishes. Preferably, the first notification and the second notification each include a different warning content. Preferably, the notification unit includes a detection unit that detects a boundary period of the content, the notification unit configured to provide the notification of the remaining battery level when the detection unit detects the boundary period. Preferably, the notification unit, when the output unit is used by a different unit, provides the notification of the remaining battery level through the output unit after the different unit finishes using the output unit. Preferably, the notification unit suspends, when the boundary period detected by the detection unit is a certain period or less, the output of the content data of the output unit during a certain period in the boundary period, and provides the notification of the remaining battery level during the certain period so as to resume the output of the content data after the notification. Preferably, the notification unit, when a hands-free call is made through the portable terminal, provides the notification of the remaining battery level after the hands-free call finishes. Preferably, the notification unit, when an estimated value of the remaining battery level is estimated to be zero or less, provides the notification of the remaining battery level during output of current content data.

A system according to an embodiment of the present invention includes the electronic device in the above described configuration and a portable terminal coupled to the electronic device. The portable terminal includes: a playback unit configured to play back content data; a transmission unit configured to transmit the content data played back by the playback unit to the electronic device; and a provision unit configured to provide battery information on a remaining battery level to the electronic device.

According to an embodiment of the present invention a notification method for a remaining battery level in an electronic device configured to couple to a portable terminal includes: receiving content data played back by the portable terminal and outputting from an output unit the content data that has been received; estimating the remaining battery level of the portable terminal after playback of second content finishes, the second content to be played back following content being played back by the portable terminal; and providing notification of the remaining battery level through the output unit at least before the playback of the second content starts or after the playback finishes, based on a result of the estimating.

According to an embodiment of the present invention, a non-transitory computer-readable storage medium storing a notification program for a remaining battery level causes an electronic device coupled to a portable terminal to execute: receiving content data played back by the portable terminal and outputting from an output unit the content data that has been received; estimating the remaining battery level of the portable terminal after playback of second content finishes, the second content to be played back following content being played back by the portable terminal; and providing notification of the remaining battery level through the output unit at least before the playback of the second content starts or after the playback finishes, based on a result of the estimating.

According to an embodiment of the present invention, a remaining battery level of a portable terminal after the playback of a second content finishes is estimated, the second content to be played back following content currently being played back. Then, notification of the remaining battery level is made at least before the playback of the second content starts or after the playback starts, based on an estimation result. Therefore, viewing and listening to the content can be prevented from being interrupted during the playback of the content. The notification of the remaining battery level in response to the remaining battery level can be made with appropriate timing before and/or after the playback of the second content.

DETAILED DESCRIPTION OF THE PREFERRED EMBODIMENTS

Next, embodiments of the present invention will be described in detail with reference to the drawings. An electronic device according to embodiments of the present invention can be applied to an in-vehicle device to be mounted in a mobile object, such as a motor vehicle, or a portable terminal to be carried into the motor vehicle. The electronic device according to embodiments of the present invention is a computer device, and can integrally include, for example, a navigation function, a function of playing back audio/video data, a function of receiving TV/radio broadcasting, and a function of executing application software. Furthermore, the electronic device according to embodiments of the present invention, includes a function of coupling to a portable terminal, such as a smartphone, a tablet terminal, or a laptop computer. The electronic device can cooperate with various functions included in the portable terminal.

Embodiments

Figure 1:
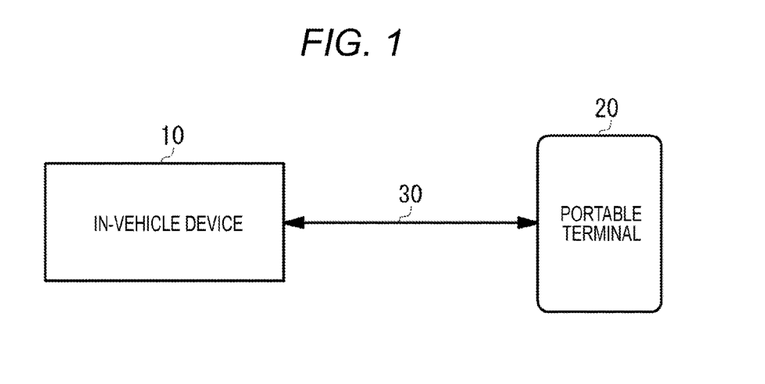
FIG. 1 is a block diagram of a cooperative system between an in-vehicle device and a portable terminal, according to the present disclosure.

FIG. 1 is a block diagram of a cooperative system between an in-vehicle device and a portable terminal, according to an embodiment of the present invention. The cooperative system includes the in-vehicle device 10 and at least one portable terminal 20 to be coupled thereto. The in-vehicle device 10 can perform interactive data communication with the portable terminal 20 through a coupling 30. The coupling 30 is preferably radio communication, and examples of the coupling 30 that can be used include coupling through Bluetooth (registered trademark) (hereinafter, referred to as BT coupling) and coupling through Wi-Fi (registered trademark) (WF coupling). Note that, according to the present embodiment, data communication through radio communication will be exemplified as the coupling 30, but the coupling 30 can include wired communication with a USB cable.

When the portable terminal 20 is coupled to the in-vehicle device 10, the in-vehicle device 10 can perform its own various functions and also perform various functions retained in the portable terminal 20. As one preferable example, when the portable terminal 20 is coupled to the in-vehicle device 10, the in-vehicle device 10 boots an application in order to cooperate with the portable terminal 20 so that the portable terminal 20 can be remotely controlled by the in-vehicle device 10 through the application.

When the application boots, for example, icons for performing the in-vehicle's own functions or icons for performing the functions retained in the portable terminal 20 are displayed on a screen of the in-vehicle device 10 so that a user can select an icon to perform a desired function. According to the present embodiment, as described below, the in-vehicle device 10 plays back content, such as music, retained in the portable terminal 20 and receives content data that has been played back from the portable terminal 20 so as to output the data. The in-vehicle device 10 provides notification of a remaining battery level of the portable terminal 20 with optimum timing so that content being played back is not interrupted.

Figure 2:
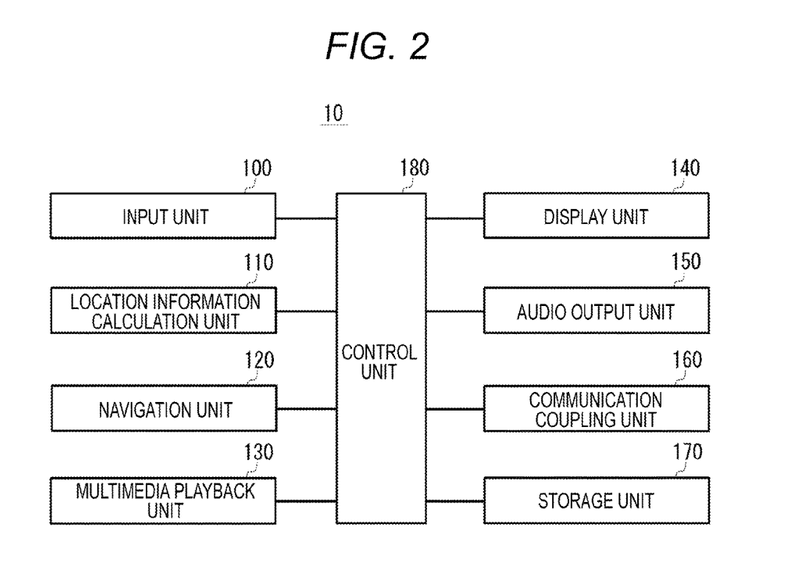
FIG. 2 is a block diagram of a configuration of an in-vehicle device according to a first embodiment of the present invention.

FIG. 2 is a block diagram of a typical configuration of an in-vehicle device according to a first embodiment. The in-vehicle device 10 according to the present embodiment includes an input unit 100, a location information calculation unit 110, a navigation unit 120, a multimedia playback unit 130, a display unit 140, an audio output unit 150, a communication coupling unit 160, a storage unit 170, and a control unit 180.

The input unit 100 receives an instruction from a user through an input key device, an audio input recognition device, or a touch panel, so as to provide the instruction to the control unit 180. The location information calculation unit 110 calculates the current location, based on a GPS signal transmitted from a GPS satellite or output from a sensor, such as a gyro sensor. The navigation unit 120 searches for a route from the current location calculated by the location information calculation unit 110 to a destination, so as to provide guidance for the route that has been searched or provide guidance for a road map around the vehicle location.

The multimedia playback unit 130 plays back content data, such as music and an image, stored in the storage unit 170 so that the audio output unit 150 outputs audio data that has been played back and the display unit 140 outputs image data that has been played back. When content data of the portable terminal 20 that has been coupled is played back, the multimedia playback unit 130 outputs audio data and image data that have been received from the portable terminal 20, through the audio output unit 150 and the display unit 140, respectively.

The display unit 140 includes a liquid crystal display or an organic EL display, and displays a road map generated by the navigation unit 120 or image data played back by the multimedia playback unit 130. The audio output unit 150 outputs audio guidance generated by the navigation unit 120 or outputs audio data played back by the multimedia playback unit 130.

The communication coupling unit 160 is capable of performing data communication with the portable terminal 20. The communication coupling unit 160 preferably establishes communication coupling with the portable terminal 20 through radio communication or wired communication. The communication coupling unit 160 is also capable of coupling to a network, using a communication function of the portable terminal 20. The storage unit 170 can store application software and a program executed by the in-vehicle device 10, road map data and content data, such as music and images.

In a preferable mode, the control unit 180 includes a microcontroller including a ROM or a RAM, and the ROM or the RAM can store various programs for controlling the operations of the respective units in the in-vehicle device 10. According to the present embodiment, the control unit 180 executes a cooperative program for making cooperation in coupling the portable terminal 20 to the in-vehicle device 10. The cooperative program includes various functions, and, here, the notification of the remaining battery level of the portable terminal 20 when the in-vehicle device 10 outputs the content data played back by the portable terminal 20 will be described in detail.

Figure 3:
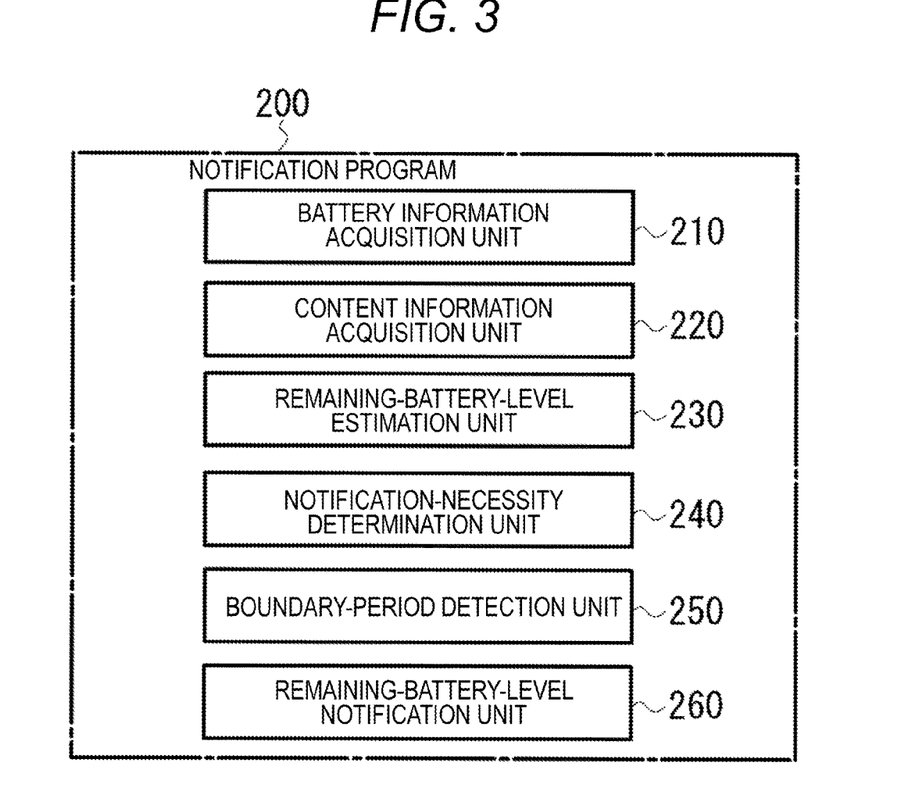
FIG. 3 is a block diagram of a functional configuration of a notification program according to the first embodiment of the present invention.

FIG. 3 is a block diagram of a functional configuration of a notification program of the remaining battery level, according to the present embodiment. The notification program 200 includes a battery information acquisition unit 210, a content information acquisition unit 220, a remaining-battery-level estimation unit 230, a notification-necessity determination unit 240, a boundary-period detection unit 250, and a remaining-battery-level notification unit 260.

The battery information acquisition unit 210 acquires from the portable terminal 20 information on a remaining level of a battery mounted in the portable terminal 20. The information includes a format in which, for example, the remaining battery level is 50%, 40%, or 30%. The method of acquiring the battery information is arbitrary. For example, the portable terminal 20 may notify the in-vehicle device 10 of the battery information at regular intervals, the portable terminal 20 may notify the in-vehicle device 10 when the remaining battery level is a predetermined value or less, or the portable terminal 20 may notify the in-vehicle device 10 when the in-vehicle device 10 requests the battery information from the portable terminal 20.

Figure 4:
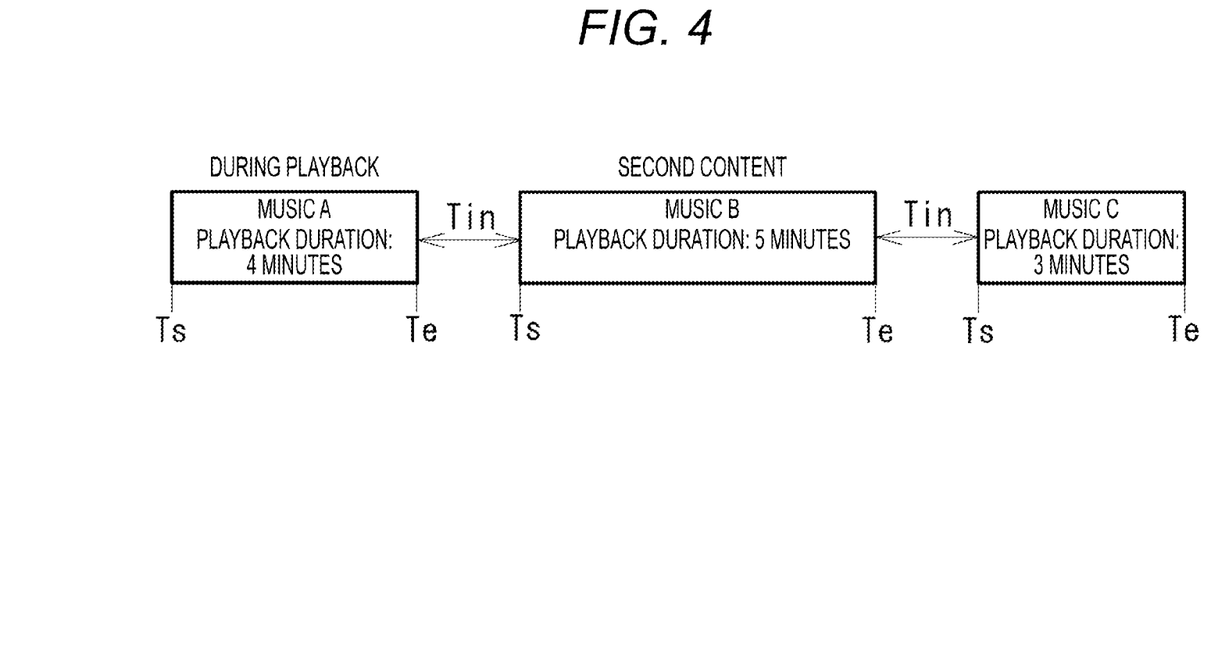
FIG. 4 is a sequence diagram for describing an exemplary playback order of content.

The content information acquisition unit 220 acquires information on playback duration of content to be next played back after content currently being played back by the portable terminal 20. For example, as illustrated in FIG. 4, music is played back in order of music A, music B and music C. While music A is currently being played back, the content information acquisition unit 220 acquires playback duration of music B (5 minutes) as content information. While music B is being played back, the content information acquisition unit 220 acquires playback duration of music C (3 minutes) as the content information. In the figure, Ts and Te represent a playback starting point and a playback ending point of each of music A, music B, and music C, respectively. Tin represents a boundary period during which audio of each music is not output, namely, an interval period. While the portable terminal 20 is playing back the content in accordance with an album or a playlist, the content information acquisition unit 220 identifies a second content, based on the album or the playlist.

Based on the remaining battery level acquired by the battery information acquisition unit 210 and the playback duration of the second content acquired by the content information acquisition unit 220, the remaining-battery-level estimation unit 230 estimates the remaining battery level when the playback of the second content finishes. The method of estimating the remaining battery level calculates the sum of the remaining playback duration of the content being currently played back and the playback duration of the second content, so as to estimate a change of the remaining battery level that may occur due to the playback of the second content, based on the total duration that has been calculated. As one preferable example, a relationship between playback duration and battery consumption level is previously prepared so that the remaining battery level is estimated based on the relationship. In one example, the remaining battery level acquired by the battery information acquisition unit 210 is defined as "60%" and total playback duration necessary for playing back the second content is defined as "6 minutes". When the battery consumption rate per unit of playback duration is "1%/min", the remaining battery level in finishing the playback of the second content can be estimated to be "54%".

The notification-necessity determination unit 240 determines whether the notification of the remaining battery level is made, based on an estimated value of the remaining battery level in finishing the playback of the second content, as estimated by the remaining-battery-level estimation unit 230. For example, it is determined that the notification is made when the estimated value is a threshold value or less, and the notification is not made when the estimated value exceeds the threshold value.

The boundary-period detection unit 250 detects the boundary period of the content, namely, the interval period Tin between music A and music B or the interval period Tin between music B and music C as illustrated in FIG. 4. The boundary period is a period during which the content, such as music, is not played back, namely, a silent period during which audio is not output. The method of detecting the boundary period can detect, but is not particularly limited to, as the boundary period, a period during which an audio signal is not detected from the portable terminal 20 over a certain period or more. Alternatively, when the interval period Tin of the content has already been known on the side of the portable terminal 20 or the in-vehicle device 10, the interval period Tin may be used. Alternatively, a boundary period during which an audio signal between content to be first played back and content to be next played back is not detected, is previously detected. After that, the boundary period that has been detected may be used.

When the notification-necessity determination unit 240 determines that the notification of the remaining battery level is necessary to make, the remaining-battery-level notification unit 260 provides the notification of the remaining battery level during the boundary period detected by the boundary-period detection unit 250. The notification method displays a warning message on the display unit 140 or outputs warning audio through the audio output unit 150, but is not particularly limited. A warning content can include, for example, a status where the remaining battery level has decreased or a prompt for charging the battery.

Figure 5:
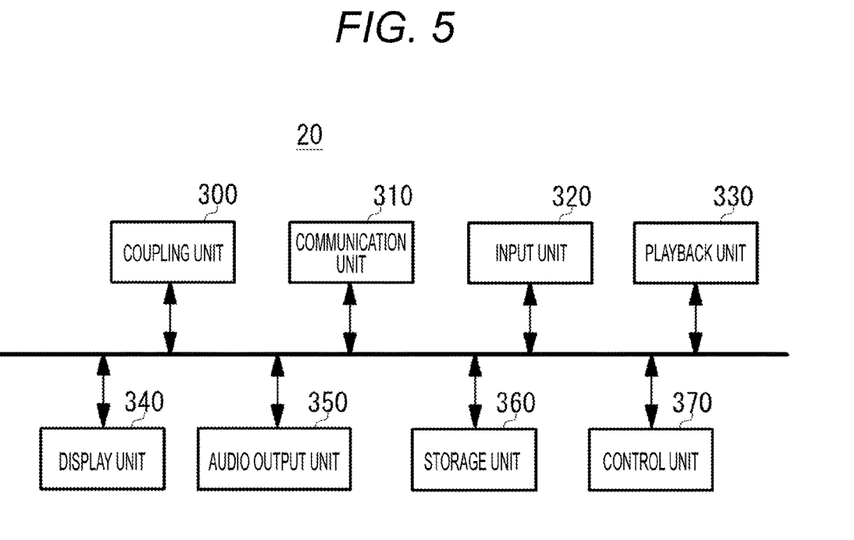
FIG. 5 is a block diagram of a typical configuration of the portable terminal.

FIG. 5 illustrates a typical exemplary configuration of the portable terminal 20. The portable terminal 20 includes a coupling unit 300, a communication unit 310, an input unit 320, a playback unit 330, a display unit 340, an audio output unit 350, a storage unit 360, and a control unit 370. The coupling unit 300 is included in the coupling 30 that performs the radio communication with the in-vehicle device 10. The communication unit 310 is capable of a voice call or data communication through a public radio line. The input unit 320 receives an instruction from the user so as to provide an instruction to the control unit 370.

The playback unit 330 plays back the content data, such as music or an image, retained in the portable terminal 20 so that the audio output unit 350 outputs audio data that has been played back and the display unit 340 displays image data that has been played back. When the portable terminal 20 is coupled to the in-vehicle device 10 and the playback unit 330 of the portable terminal 20 plays back the content data based on an instruction from the in-vehicle device 10 or the portable terminal 20, the content data that has been played back is transmitted to the in-vehicle device 10 through the coupling unit 300. The storage unit 360 can store software for performing the functions of the portable terminal 20, and the content data, such as music or an image.

In a preferable mode, the control unit 370 includes a microcontroller including a ROM or a RAM, and the ROM or the RAM can store various programs for controlling the operations of the respective units in the portable terminal 20. According to the present embodiment, the control unit 370 can execute the cooperative program for making the cooperation when the portable terminal 20 is coupled to the in-vehicle device 10.

The portable terminal 20 provides the battery information on the remaining level of the battery to the in-vehicle device 10, based on the execution of the cooperative program. For example, when the remaining battery level reaches a predetermined value (e.g., a remaining battery level of 50%, 40%, or 30%), or with regular time intervals, the battery information is provided to the in-vehicle device 10. Alternatively, the battery information may be provided in response to a request from the in-vehicle device 10. Furthermore, in playing back a series of pieces of content, the portable terminal 20 may provide the in-vehicle device 10 with the playback duration of the second content, as content information. Alternatively, information such as the playback order, the playback duration and the interval period of the content included in the album or the playlist may be provided when the album or the playlist retained in the portable terminal 20 is played back.

Next, an operation of the cooperative system according to the present embodiment will be described with reference to a flow chart in FIG. 6. First, the in-vehicle device 10 and the portable terminal 20 are coupled through the coupling 30 as illustrated in FIG. 1 (S100), and then the cooperation between the in-vehicle device 10 and the portable terminal 20 starts. As one example, when the portable terminal 20 is coupled to the in-vehicle device 10, the cooperative program booted in the in-vehicle device 10 allows the in-vehicle device 10 to operate the portable terminal 20. For example, the display unit 140 of the in-vehicle device 10 displays the icons for performing the functions included in the portable terminal 20 so that the user can select an icon so as to perform a desired function of the portable terminal 20. Here, the user issues an instruction for playing back the content retained by the portable terminal 20 to the portable terminal 20 (S102). In playing back the content on the side of the portable terminal 20, the in-vehicle device 10 can acquire the content information (e.g., an album list, an artist list, a playlist, and my music) retained by the portable terminal 20 so as to issue an instruction for playing back desired content in the information.

When the in-vehicle device 10 outputs the instruction for the playback to the portable terminal 20, the portable terminal 20 starts playing back the content in accordance with the instruction for the playback. For example, when the in-vehicle device 10 issues an instruction for playing back artist X, the portable terminal 20 starts playing back music of artist X. Here, artist X includes a plurality of pieces of music A, B, C to N, and the playback is made in alphabetical order. Content data played back by the portable terminal 20 (here, audio data of music A) is transferred to the in-vehicle device 10, and the in-vehicle device 10 outputs the content data that has been received through the display unit 140 and the audio output unit 150 (S106).

When the portable terminal 20 provides the in-vehicle device 10 with the battery information on the remaining battery level in accordance with a predetermined condition, the battery information acquisition unit 210 acquires the battery information (S108). Next, the content information acquisition unit 220 acquires the playback duration of the second content (in this case, playback duration of music B) so that the remaining-battery-level estimation unit 230 estimates the remaining battery level after the playback of the second content finishes (in this case, when the playback of music B finishes) (S110). For example, the content information acquisition unit 220 can acquire the second content and the playback duration thereof from playback information included in artist X. Alternatively, as necessary, a request for notification of the playback duration of the second content can be made to the portable terminal 20.

Next, the notification-necessity determination unit 240 determines that the notification of the remaining battery level is necessary to make when the remaining battery level is a threshold value or less (S112), and a result of the determination is provided to the boundary-period detection unit 250. When the boundary-period detection unit 250 detects an interval period before the playback of the second content starts or after the playback of the second content starts (S114), the remaining-battery-level notification unit 260 makes notification of a warning of the remaining battery level (S116). The notification-necessity determination unit 240 determines that the notification of the remaining battery level is unnecessary to make when the remaining battery level exceeds the threshold value. The necessity of the notification of the remaining battery level is repeatedly determined every time the battery information is acquired.

Figure 7:
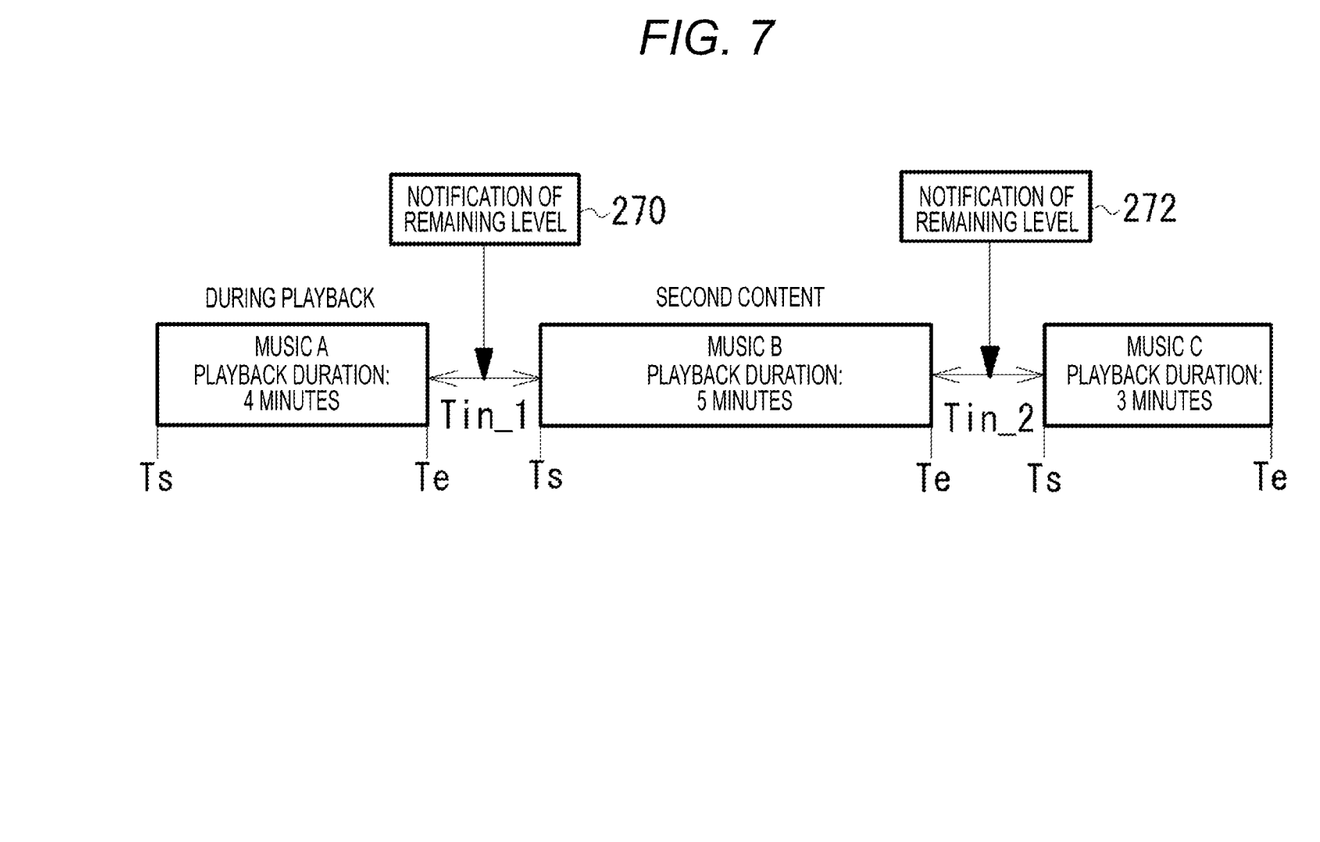
FIG. 7 is a sequence diagram of notification timing of the remaining battery level according to the first embodiment of the present invention.

FIG. 7 illustrates exemplary notification timing of the warning of the remaining battery level. As illustrated in the figure, during playback of music A, when the remaining battery level is estimated to be the threshold value or less after playback of music B finishes, the boundary-period detection unit 250 detects an interval period Tin_1 between music A and music B or an interval period Tin_2 between music B and music C. Then, notifications of the remaining battery level 270 and 272 are made during either the interval period Tin_1 or the interval period Tin_2, or both of the periods.

In this manner, according to the present embodiment, the notification of the remaining battery level is made during a silent period between music, before the playback of the second content starts or after the playback finishes, so that, during the playback of the content, such as music or an image, viewing and listening to the content are not interrupted.

Next, a modification of the first embodiment will be described. The remaining battery level is estimated in consideration of the playback duration of the second content and then the notification of the remaining battery level is made, according to the first embodiment. According to the modification, notification of the remaining battery level is made when the remaining battery level falls below the threshold value after playback of content following the second content (hereinafter, referred to as third content) finishes. The content information acquisition unit 220 acquires information on playback duration of the third content, and the remaining-battery-level estimation unit 230 estimates the remaining battery level after the playback of the third content finishes. With reference to the example in FIG. 4, the remaining battery level is estimated after the playback of music C finishes. When an estimated value of the remaining battery level is the threshold value or more after the playback of the second content finishes, the notification-necessity determination unit 240 determines whether the estimated value of the remaining battery level is the threshold value or more after the playback of the third content finishes. When the estimated value falls below the threshold value, the notification-necessity determination unit 240 determines that the notification of the remaining battery level is necessary to make at least before the playback of the third content starts or after the playback finishes. The remaining-battery-level notification unit 260 makes the notification of the remaining battery level based on a determination result of the notification-necessity determination unit 240.

According to the modification, even when the remaining battery level is not the threshold value or less in finishing the playback of the second content, the notification is made when the remaining battery level is estimated to be the threshold value or less during the playback of the third content. Therefore, it can be previously known that the remaining battery level is to be low during the playback of the third content.

Next, a second embodiment of the present invention will be described. The first embodiment has exemplified that the notification of the warning of the remaining battery level is arbitrarily made at least before the playback of the second content starts or after the playback starts, or in both cases. According to the second embodiment, notification of a remaining battery level, selectable before playback of second content starts and after the playback starts, can be made.

Figure 6:
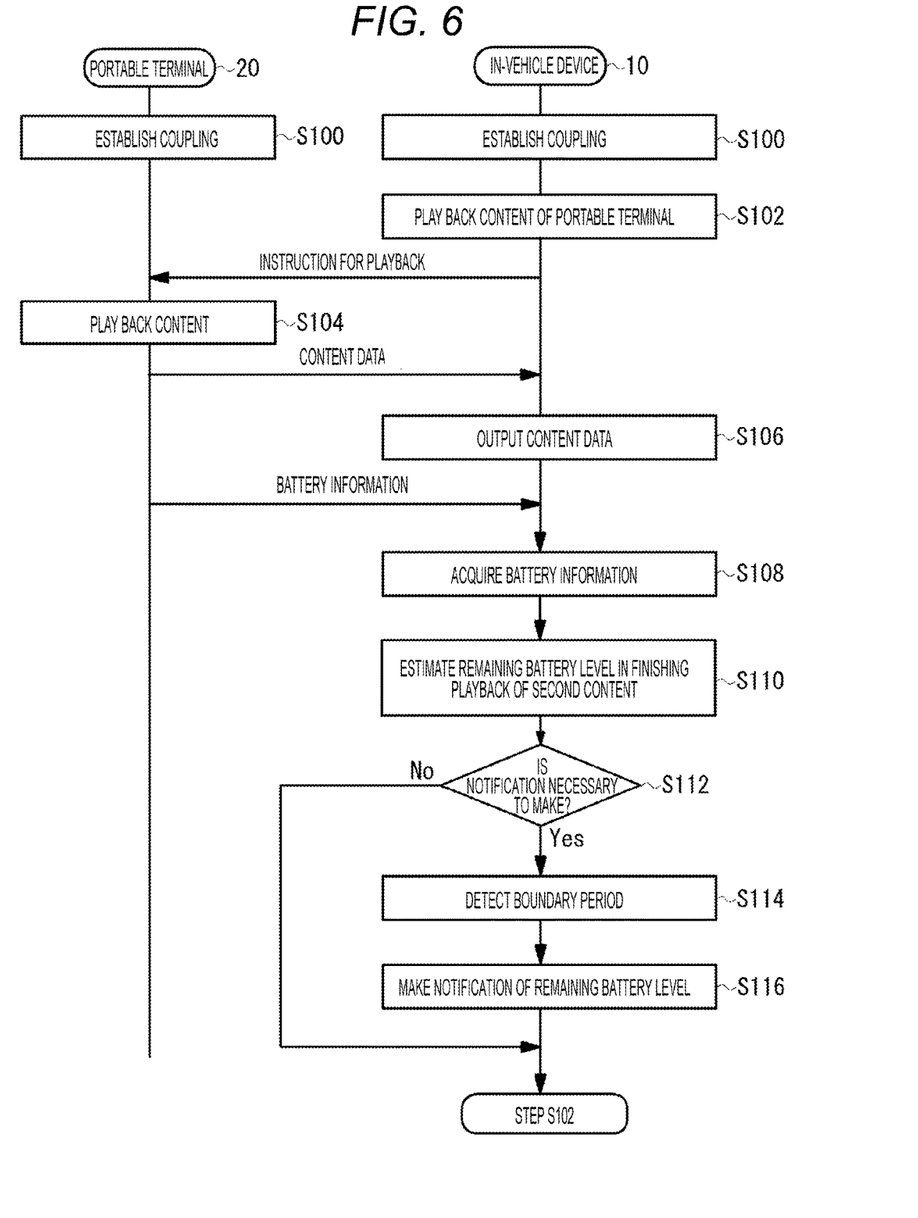
FIG. 6 is a flow chart of an operation of notification of a remaining battery level according to the first embodiment of the present invention.
Figure 8:
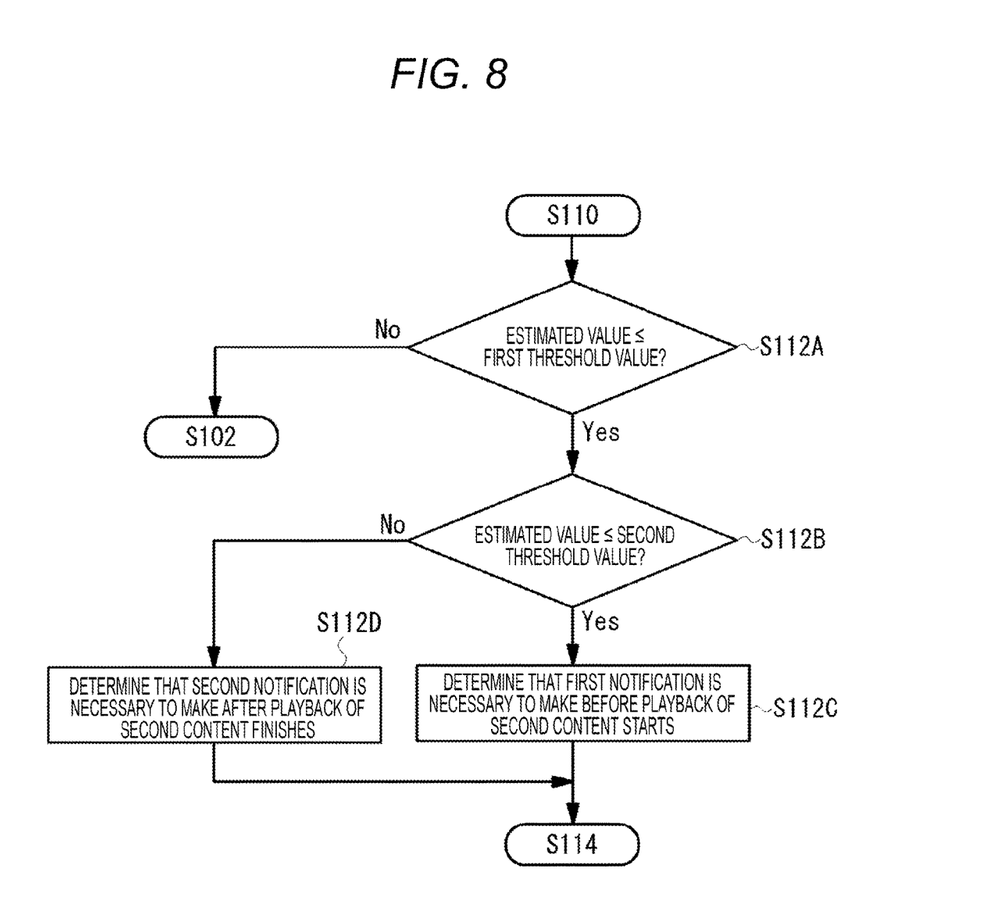
FIG. 8 is a flow chart of an operation of notification of a remaining battery level according to a second embodiment of the present invention.

FIG. 8 is a flow chart of a notification-necessity determination unit 240 according to the second embodiment, and corresponds to step S112 illustrated in FIG. 6. According to the second embodiment, the notification-necessity determination unit 240 compares an estimated value of the remaining battery level with a first threshold value and a second threshold value (the first threshold value>the second threshold value) so as to vary a content of the notification to be made, in response to notification timing. First, when the estimated value of the remaining battery level is the first threshold value or less (S112A) and is the second threshold value or less (S112B), the notification-necessity determination unit 240 determines that first notification is necessary to make between music pieces before the playback of the second content starts (S112C), and determines that second notification is necessary to make between music pieces after the playback of the second content finishes when the estimated value exceeds the second threshold value (S112D).

Figure 9:
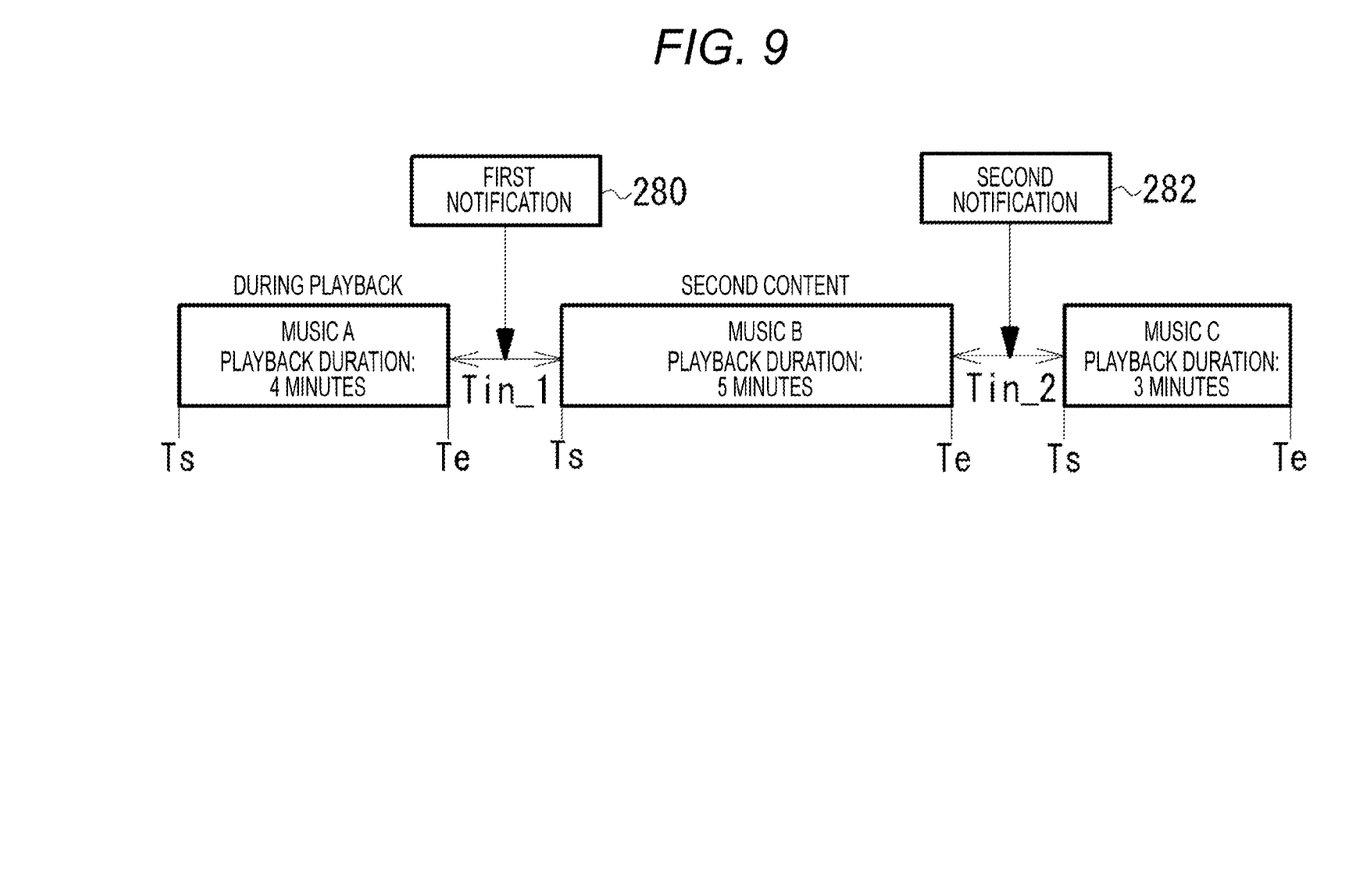
FIG. 9 is a sequence diagram of notification timing of the remaining battery level according to the second embodiment of the present invention.

Based on a determination result of the notification-necessity determination unit 240, a boundary-period detection unit 250 detects a boundary period before the playback of the second content starts and a boundary period after the playback of the second content finishes, so as to transmit a detection result to a remaining-battery-level notification unit 260. Based on the determination result of the notification-necessity determination unit 240, as illustrated in FIG. 9, the remaining-battery-level notification unit 260 makes the first notification 280 during a period Tin_1 before the playback of the second content starts and makes the second notification 282 during a period Tin_2 after the playback of the second content finishes. The first notification 280 preferably includes a warning to the effect that charging is necessary to start because the remaining battery level will be considerably low if the playback of the second content is performed. The second notification 282 preferably includes a warning to the effect that the remaining battery level is low. For example, the first notification includes a warning that the remaining battery level will be the second threshold value or less after the playback of the second content finishes, and the second notification includes a warning that the remaining battery level will be the first threshold value or less after the playback of the second content finishes.

In this manner, according to the second embodiment, varying the warning in response to the degree of the remaining battery level can notify a user of an appropriate content, and the notification of the warning can be made before the playback of the second content starts and after the playback finishes.

According to this embodiment, the first notification is made before the playback of the second content starts and the second notification is made after the playback finishes, in response to the comparison result between the estimated value and the second threshold value, but this is not limited. When the estimated value is the second threshold value, the first notification may be made before the playback of the second content starts and after the playback starts.

Figure 10A:
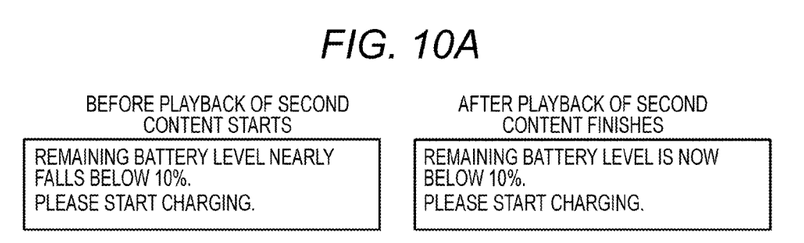
FIGS. 10A and 10B are views each illustrating an exemplary notification content of a remaining battery level according to a modification of the second embodiment of the present invention.
Figure 10B:
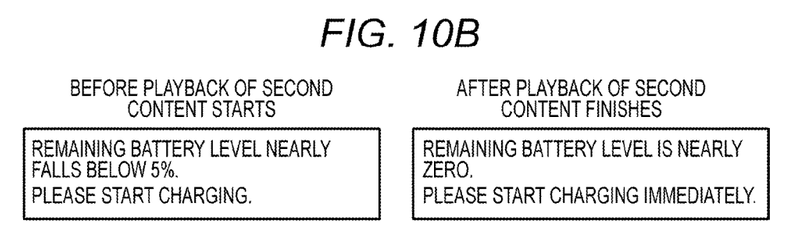

Next, a first modification of the second embodiment will be described. According to the second embodiment, the first notification or the second notification is made between music pieces before and after the second content, but notification of the remaining battery level may be made between music pieces before and after the second content. For example, when the first threshold value and the second threshold value are defined to be "20%" and "10%", respectively, and the estimated value of the battery remaining level is the first threshold value or less, but exceeding the second threshold value (e.g., an estimated value of 15%), as illustrated in FIG. 10A, the notification illustrated in FIG. 10A is made before and after the second content. When the estimated value is the first threshold value or less and additionally is the second threshold value or less (e.g., an estimated value of 4%), as illustrated in FIG. 10B, a notification to the effect that the estimated value will fall below the second threshold value before the playback of the second content starts and a notification to the effect that it is necessary to charge the battery after the playback finishes can be given.

Next, a second modification of the second embodiment will be described. According to the second modification, a case where the second threshold value is zero, namely, the estimated value of the remaining battery level is zero or less, is given. According to the second modification, when the estimated value will be zero or less after the playback of the second content finishes, the remaining-battery-level notification unit 260 may exceptionally make a notification to the effect that the remaining battery level will be zero, even while content is currently being played back. For example, after the playback of the second content starts, a portable terminal 20 stops operating during the playback so that the user can be prevented from encountering an unforeseen situation.

According to this embodiment, the notification of the remaining battery level is made during the boundary period (between music pieces) Tin of the content. However, when the boundary period Tin is short, the notification of the remaining battery level (an audio guide) may not fit. In this case, the remaining-battery-level notification unit 260 may suspend, during a certain period, audio output of content data received from the portable terminal 20, and may start outputting the content data after the notification of the remaining battery level is made.

According to the embodiment, once the charging of the battery of the portable terminal 20 starts, the notification of the remaining battery level is considered to be unnecessary. Thus, the portable terminal 20 may notify, when the charging of the battery has started, an in-vehicle device 10 to that effect, and the in-vehicle device 10 may stop operating a notification program 200 when having received this notification.

According to the embodiment, the notification of the remaining battery level is made during the boundary period of the content (between music pieces). However, for example, when a navigation unit 120 is actuated in the in-vehicle device 10 and the content is output in the background thereof, reading out of text data of the navigation unit 120 (audio output) and audio output of the remaining battery level may conflict with each other. In this case, the audio guide or a display of the remaining battery level is preferably performed during a period during which no text data is read out.

Furthermore, when the portable terminal 20 and the in-vehicle device 10 have been coupled, the portable terminal 20 is kept in a state where a hands-free call is available. Therefore, only a display unit 140 can perform the display of the remaining battery level during the hands-free call, and the audio output of the notification of the remaining battery level can be performed again after the hands-free call finishes.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An electronic device configured to be coupled to a portable terminal, the electronic device comprising:
   a reception unit configured to receive content data played back by the portable terminal;
   an output unit configured to output the content data that has been received;
   an estimation unit configured to estimate a remaining battery level of the portable terminal after playback of a second content finishes, the second content to be played back following content being played back by the portable terminal; and
   a notification unit configured to provide notification of the remaining battery level through the output unit at least before the playback of the second content starts or after the playback of the second content finishes, based on an estimation result of the estimation unit.

2. The electronic device according to claim 1,
   wherein the estimation unit includes a battery information acquisition unit that acquires battery information on the remaining battery level of the portable terminal from the portable terminal, the estimation unit configured to estimate the remaining battery level after the playback of the second content finishes, based on the battery information.

3. The electronic device according to claim 1,
   wherein the estimation unit estimates the remaining battery level based on playback duration of the second content.

4. The electronic device according to claim 3,
   wherein the estimation unit includes a content information acquisition unit that acquires content information on playback duration of the content from the portable terminal, the estimation unit configured to estimate the remaining battery level in finishing the playback of the second content based on the content information.

5. The electronic device according to claim 1,
   wherein the notification unit provides, when an estimated value of the remaining battery level of the estimation unit is a first threshold value or less, the notification of the remaining battery level before the playback of the second content starts or after the playback finishes.

6. The electronic device according to claim 5,
wherein the notification unit provides, when the estimated value is a second threshold value or less, the second threshold value being smaller than the first threshold value, first notification of the remaining battery level before the playback of the second content starts, and provides, when the estimated value exceeds the second threshold value, second notification of the remaining battery level after the playback of the second content finishes.

7. The electronic device according to claim 6,
wherein the first notification and the second notification each include a different warning content.

8. The electronic device according to claim 1,
wherein the notification unit includes a detection unit that detects a boundary period of the content, the notification unit configured to provide the notification of the remaining battery level during the boundary period.

9. The electronic device according to claim 1,
wherein the notification unit provides, when the output unit is used by a different unit, the notification of the remaining battery level through the output unit after the different unit finishes using the output unit.

10. The electronic device according to claim 8,
wherein the notification unit suspends, when the boundary period detected by the detection unit is a certain period or less, the output of the content data of the output unit during a certain period in the boundary period, and provides the notification of the remaining battery level during the certain period so as to resume the output of the content data after the notification.

11. The electronic device according to claim 1,
wherein the notification unit provides, when a hands-free call is made through the portable terminal, the notification of the remaining battery level after the hands-free call finishes.

12. The electronic device according to claim 1,
wherein the notification unit provides, when an estimated value of the remaining battery level is estimated to be zero or less, the notification of the remaining battery level during output of current content data.

13. A system comprising:
the electronic device according to claim 1; and
a portable terminal coupled to the electronic device,
wherein the portable terminal includes:
a playback unit configured to play back content data;
a transmission unit configured to transmit the content data played back by the playback unit to the electronic device; and
a provision unit configured to provide battery information on a remaining battery level to the electronic device.

14. The system according to claim 13,
wherein the provision unit provides the battery information at a regular time interval.

15. The system according to claim 13,
wherein the provision unit provides the battery information when the remaining battery level is a predetermined value.

16. A notification method of a remaining battery level in an electronic device configured to be coupled to a portable terminal, the notification method comprising:
receiving content data played back by the portable terminal and outputting, from an output unit, the content data that has been received;
estimating the remaining battery level of the portable terminal after playback of a second content finishes, the second content to be played back following content being played back by the portable terminal; and
providing notification of the remaining battery level through the output unit at least before the playback of the second content starts or after the playback of the second content finishes, based on an estimation result of the estimating.

17. The notification method according to claim 16,
wherein the step of providing notification of the remaining battery level provides, when an estimated value of the estimating is a threshold value or less, first notification of the remaining battery level before the playback of the second content starts, and provides, when the estimated value exceeds the threshold value, second notification of the remaining battery level after the playback of the second content finishes.

18. The notification method according to claim 16,
wherein the step of providing notification of the remaining battery level provides, when the output unit is used by a different unit, the notification of the remaining battery level through the output unit after the different unit finishes using the output unit.

\* \* \* \* \*